US012129819B2

(12) United States Patent
Reidelbach

(10) Patent No.: US 12,129,819 B2
(45) Date of Patent: Oct. 29, 2024

(54) RESONATOR INSERT FOR INSERTION INTO AN INTAKE PIPE OF A TURBOCHARGER, TURBOCHARGER AND RESONATOR

(71) Applicant: Umfotec GmbH, Northeim (DE)

(72) Inventor: Marco Reidelbach, Hann. Muenden (DE)

(73) Assignee: Umfotec GmbH, Northeim (DE)

( * ) Notice: Subject to any disclaimer, the term of this patent is extended or adjusted under 35 U.S.C. 154(b) by 323 days.

(21) Appl. No.: 17/667,622

(22) Filed: Feb. 9, 2022

(65) Prior Publication Data

US 2022/0260045 A1 Aug. 18, 2022

(30) Foreign Application Priority Data

Feb. 12, 2021 (DE) ..................... 10 2021 103 379.9

(51) Int. Cl.

| | |
|---|---|
| ***F02M 35/12*** | (2006.01) |
| ***F02M 35/10*** | (2006.01) |
| ***G10K 11/16*** | (2006.01) |
| ***G10K 11/172*** | (2006.01) |

(52) U.S. Cl.
CPC .. *F02M 35/1255* (2013.01); *F02M 35/10157* (2013.01); *G10K 11/161* (2013.01); *G10K 11/172* (2013.01)

(58) Field of Classification Search
CPC ......... F02M 35/1255; F02M 35/10157; F02M 35/1261; G10K 11/161; G10K 11/172; F04D 29/66; F04D 29/665; F01D 9/04; F01D 17/10; F02B 33/40
See application file for complete search history.

(56) References Cited

U.S. PATENT DOCUMENTS

| | | | | |
|---|---|---|---|---|
| 8,197,188 B2 * | 6/2012 | Clay | ........................ | F04D 25/04 415/119 |
| 8,408,357 B2 * | 4/2013 | Cheung | .............. | F02M 35/1266 123/184.55 |
| 11,391,252 B2 * | 7/2022 | Gautam | ............. | F02M 35/1266 |
| 2020/0340497 A1 | 10/2020 | Lombard et al. | | |

FOREIGN PATENT DOCUMENTS

| | | |
|---|---|---|
| DE | 199 43 246 | 3/2001 |

* cited by examiner

*Primary Examiner* — Dedei K Hammond
*Assistant Examiner* — Joseph James Peter Illicete
(74) *Attorney, Agent, or Firm* — Gerald E. Hespos; Michael J Porco

(57) ABSTRACT

A resonator insert (14) is provided for coaxial and sectionally radially spaced insertion in an intake pipe of a turbocharger (10). The resonator insert (14) has a tube section (141) with a wall having circumferentially extending, axially adjacent through-slots (142). The wall of the tube section (141) carries at least one radially outwardly directed, axially extending lamella (144) crossing the through-slots (142). A turbocharger with an upstream resonator also is provided.

17 Claims, 3 Drawing Sheets

RESONATOR INSERT FOR INSERTION INTO AN INTAKE PIPE OF A TURBOCHARGER, TURBOCHARGER AND RESONATOR

FIELD OF THE INVENTION

The invention relates to a resonator insert for coaxial and sectionally radially spaced insertion into an intake pipe of a turbocharger. The resonator insert includes a tube section with a wall having through-slots extending predominantly in the circumferential direction and axially adjacent to one another. The invention further relates to a turbocharger for generating an air flow in a piping system and to a resonator.

RELATED ART

Turbochargers are used in vehicles with internal combustion engines to suck in and compress air and to make the air available in large quantities to the combustion process in the cylinders. Noise generated during use of a turbocharger generally is considered a disadvantage. It is therefore known to provide turbochargers with noise reducers that operate on the principle of a Helmholtz resonator. To save installation space, these noise reducers often are integrated in the intake pipe directly in front of the compressor wheel of the turbocharger. The intake pipe of the turbocharger serves as the outer pipe of the resonator, and an inner tube section is arranged coaxially within the intake pipe. The inner pipe is fixed coaxially in the intake pipe by providing reduced diameters at both ends of the intake pipe compared with its central region, and the outer diameter of the inner tube section is adapted to the inner diameter of the narrowed intake pipe ends to form a sealing and mechanically fixing connection, e.g. by pressing or welding. The intake pipe forms an annular chamber surrounding the inner tube section axially between these end sealing areas. The wall of the inner tube section is provided with so-called acoustic slots. The acoustic slots are narrow through-slots through the wall of the inner tube section. More particularly, the acoustic slots extend predominantly in the circumferential direction and are arranged adjacent to one another in a gill-like manner. The acoustic slots can extend perpendicularly or obliquely to the axial direction. The compressor wheel of the turbocharger draws air through the intake pipe during operation of the turbocharger. Sound waves propagating in this air pass through the acoustic slots and into the annular chamber, which also is known as the resonator chamber. These sound waves are superimposed on their own reflections at the chamber walls, resulting in the targeted cancellation of certain sound frequency bands. If the chamber dimensions are matched correctly to particularly strong sound frequencies, there can be a significant reduction in noise, an increase in comfort for the driver of a corresponding motor vehicle and a reduction in external noise pollution.

It has become established practice to implement the resonator by: inserting an insert consisting essentially of the inner tube section with the acoustic slots into a first axial part of an intake pipe that consists of two axial parts, putting on the second axial part of the intake pipe, pressing the second axial part of the intake pipe against the first axial part and connecting the second part of the intake pipe to the first part, e.g. by pressing or welding. This process fixes the tube section of the resonator insert in the final assembly position described above. The intake pipe often is made of aluminum, and the resonator insert frequently is made of plastic, although metallic variants are common.

An expansion of the so-called turbocharger characteristic diagram can be observed in designs where the acoustic slots extend very close to the end of the tube section on the compressor wheel side, i. e. very close to the compressor wheel itself. The turbocharger characteristic diagram describes the area of efficient operability of the turbocharger in the parameter plane formed by the pressure on the one hand and the mass flow on the other. The characteristic diagram is limited on the one hand by the so-called stuff limit and on the other hand by the so-called pump limit. The pump limit describes a minimum mass flow at a given pressure, and at the pump limit there is a flow reversal in the radially outer areas of the intake pipe. This leads to a narrowing of the effective intake cross-section, which in turn further reduces the possible mass flow and intensifies the aforementioned reverse flow. The stuff limit in turn describes the maximum mass flow at a given pressure. A further increase in the mass flow leads to blockages, which in the radially outer area of the intake pipe result in areas of reduced flow velocity, and thus in obstructions in the air flow and likewise in a narrowing of the effective intake cross section.

The use of resonators directly in front of the compressor wheel, which are actually intended primarily for noise reduction, leads to a certain widening of the characteristic diagram because the air masses narrowing the effective intake cross section can escape at least through the acoustic slots that are close to the compressor wheel and into the resonator chamber. Such resonators therefore often also are referred to as pump limit displacement resonators (PLD resonators) in accordance with their actual secondary function.

However, an even greater widening of the turbocharger characteristic diagram would be desirable.

It is an object of the invention to provide devices that broaden the turbocharger characteristic diagram.

SUMMARY OF THE INVENTION

One aspect of the invention relates to resonator insert for coaxial and sectionally radially spaced insertion into an intake pipe of a turbocharger. The resonator insert in accordance with this aspect of the invention has a tube section with a wall having through-slots extending predominantly in the circumferential direction and axially adjacent to one another. The wall of the tube section carries at least one radially outwardly directed, axially extended lamella crossing the through-slots.

Another aspect of the invention relates to turbocharger for generating an air flow in a piping system. The turbocharger according to this aspect of the invention includes a rotatable compressor wheel and an intake pipe located directly upstream of the compressor wheel in the direction of air flow, with reduced pipe cross-sections at both ends. The turbocharger in accordance with this aspect of the invention further has a resonator insert arranged coaxially in the intake pipe. The resonator insert has a tube section that terminates sealingly with the ends of reduced cross-section of the intake pipe and has in its wall a plurality of through-slots in the wall thereof. The through-slots extend predominantly in the circumferential direction and are axially adjacent to one another and via which the interior of the tube section is connected to a resonator chamber formed between the tube section wall and the wall of the intake pipe.

The tube section of at least certain embodiments carries at least one radially outwardly directed axially extended lamella crossing the through-slots.

The resulting, functional resonators are not limited to use in the context of turbochargers. Therefore, a resonator as described herein where the wall of the inner tube section carries at least one radially outwardly directed, axially extended lamella crossing the through-slots constitutes an independent aspect of the present invention.

In a kinematic reversal of this idea, an aspect of the invention also relates to a resonator where the wall of the outer pipe carries at least one radially inwardly directed, axially extended lamella crossing the through-slots.

The invention is based on the realization that the air masses escaping into the resonator chamber form an annular flow in the resonator chamber, and the annular flow circulates around the (inner) tube section. This movement causes at least parts of these rotating air masses to penetrate back out of the resonator chamber through the acoustic slots and then cause a narrowing of the effective cross-section of the intake and of the flow. The lamella of the invention prevents or significantly reduces this harmful annular flow. As a result, the air masses in question are distributed along the axially extended lamellae and do not penetrate back out of the resonator chamber, or merely not to such an extent or distributed over the axial length of the inner tube section.

In some embodiments, the wall of the inner tube section further carries an annular wall that is directed radially outwardly, is annular disc-shaped, and is oriented perpendicular to the axial direction. This annular wall thus divides the resonator chamber into two axial sections that can act as separate resonator chambers. If the radial height of the annular wall is designed to rest against the wall of the outer pipe of the resonator or the intake pipe of the turbocharger, the two axial annular chamber sections or the two annular chambers are sealed against each other. However, the separation of the axial annular chamber sections by the annular wall may be incomplete, since at least some areas of the annular wall have a reduced radial height compared to the wall spacing between the (inner) tube section and intake pipe or outer pipe. The result is two interacting resonator chambers. The skilled person will recognize that the arrangement of more than one annular wall with a corresponding increase in the number of resonator chambers is also possible.

It is possible that the annular wall is arranged in the axially central area of the (inner) tube section and that the through-slots are arranged on only one axial side of the annular wall. In particular, the through-slots should be arranged on the compressor wheel side of the ring wall. As explained above, the additional widening of the characteristic diagram according to the invention occurs especially when the effective area of the resonator, i. e. the axial area in which the acoustic slots are arranged, is as close as possible to the compressor wheel.

The skilled person has a wide variety of possible shapes of the lamellae according to the invention, and some of the preferred shapes will be explained below. They all have in common that they are suitable for achieving the above-described effect of preventing or at least obstructing the annular flow in the resonator chamber and thus reducing the harmful constriction of the effective intake cross-section.

In a first embodiment, the radially outer edge of the lamella rests against the wall of the intake pipe or outer pipe. With this embodiment, the possibility of annular flow in the resonator chamber is prevented completely over the entire axial length of the intake pipe or outer pipe, or at least over its length from its end to a sealing annular wall that may be provided.

Alternatively, the radially outer edge of the lamella can be spaced at least in sections from the wall of the intake pipe or outer pipe. In this embodiment, annular flow remains possible in principle, but is significantly obstructed. Embodiments with a sealingly abutting annular wall are configured so that the radially outer edge of the lamella is at a lower radial height than the radially outer edge of the annular wall or so that the radial height of the radially outer edge of the lamella varies over its length. The above variants differ essentially in their acoustic effects. The person skilled in the art will therefore make a choice in view of the overall result desired in each case.

The skilled person can also vary the axial extension of the lamella according to the invention. Preferably, the lamella extends in the axial direction from a free end of the tube section, namely the end on the compressor wheel side, to the annular wall—if present. In this way, a truly complete interruption of the resonator chamber and thus of the disadvantageous annular flow can be achieved. The same applies, of course, in the case of a missing annular wall when a lamella is used which extends over the entire length of the resonator chamber, i.e. the (inner) tube section.

The lamella can have one or more through-holes, and in some embodiments, the lamella has several circular through-holes of different diameters. The number and size of the circular holes are selected to achieve a particularly precise tuning of the acoustic effects of the lamella.

Alternatively, the lamella can have precisely one passage opening that occupies the major part of its lamella surface, so that the lamella is reduced to a bow arching over the passage opening. This bow can rest against the wall of the intake pipe or the outer pipe. This embodiment has a smaller reduction in the annular flow. However, the acoustic properties such a resonator differs very little from conventional resonators with otherwise identical dimensions.

Plural lamellae can be distributed over the circumference of the (inner) tube section. These lamellae can be of the same design or of different designs. The provision of several lamellae leads to an even greater interruption of the resonator chamber in the circumferential direction, which also prevents the formation of small-scale vortices that can have a similarly detrimental effect as the circumferential ring flow described above.

The above explanations also apply mutatis mutandis to embodiments in which the lamella or lamellae are not or not only fixed to the (inner) tube section, i. e. are part of the resonator insert, but to the outer pipe. In the specific context of turbochargers, this will generally be impractical in terms of production technology, although by no means impossible; for resonators in general, including the specific application in the context of a turbocharger, however, such variants are certainly conceivable alternatives.

Further details and advantages of the invention will be apparent from the following specific description and drawings.

DETAILED DESCRIPTION

Like reference signs in the figures indicate like or analogous elements.

Figure 1:
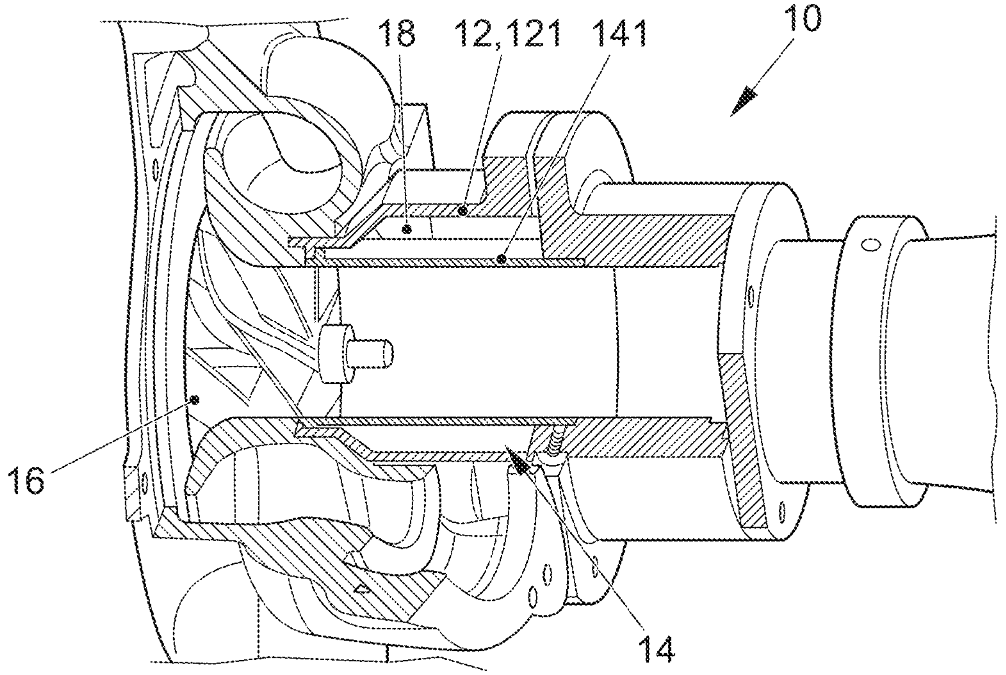
FIG. 1 PRIOR ART
FIG. 1 is partial sectional view of a known turbocharger with resonator insert dummy.

FIG. 1 is a partially cutaway view of a known turbocharger 10 with an intake pipe 12 and a dummy of a resonator insert 14 inserted therein. FIG. 1 serves merely to illustrate the typical positioning of the resonator insert 14 in a turbocharger with respect to both known resonator inserts 14 and those according to the invention. The resonator insert 14 in FIG. 1 merely is a tube section 141 positioned immediately upstream of the compressor wheel 16 of the turbocharger 10 in the direction of flow. The intake pipe 12 forms an outer pipe 121 in which the resonator insert 14 is fixed coaxially In the axial central region of the resonator insert 14, the inner diameter of the outer pipe 121 is larger than the outer diameter of the tube section 141. In the end regions of the resonator insert 14, however, the outer pipe 121 tapers in such a way that it clamps the tube section 141 in a sealing manner. This creates an annular resonator chamber 18 that is in air-exchanging communication with the interior of the resonator insert 14 via acoustic slots not shown in FIG. 1 (142 cf. FIGS. 2 and 3). Such an arrangement acts in a known manner as a Helmholtz resonator.

Figure 2:
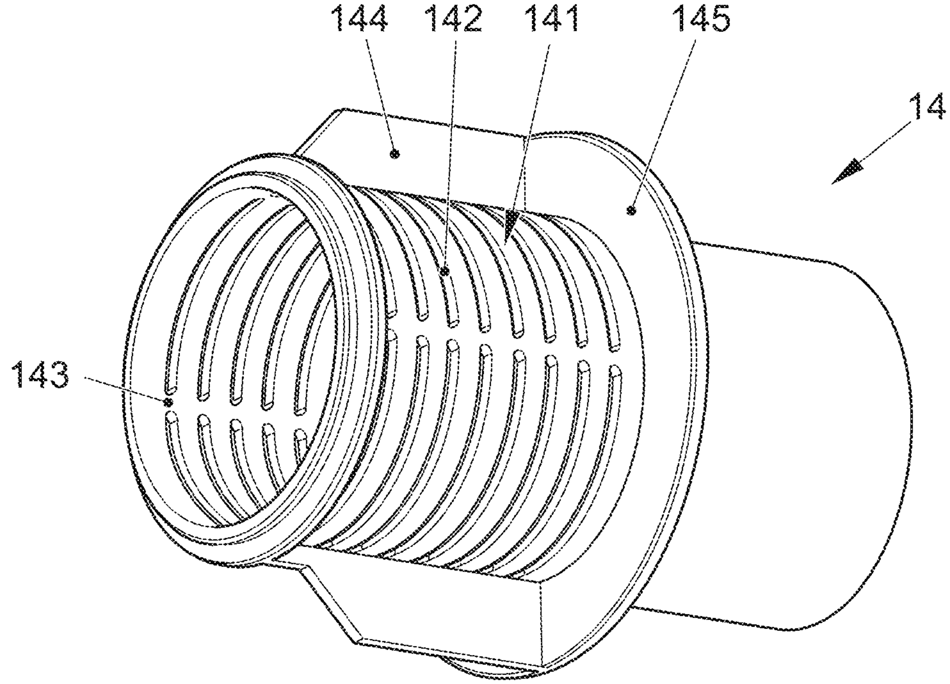
FIG. 2 is a perspective view of a resonator insert according to the invention.

FIG. 2 shows a first embodiment of a resonator insert 14 according to the invention. The resonator insert 14 could be inserted in the intake pipe 12 of the turbocharger 10 of FIG. 1. Clearly visible are the narrow acoustic slots 142 extending in the circumferential direction and arranged side by side in the axial direction in a gill-like manner. These cannot, of course, run completely around the circumference of the tube section 141. However, to come as close as possible to this technically unfeasible ideal situation, the acoustic slots 142 are divided into only four angular sections of equal size, each separated from the others in the circumferential direction by narrow webs 143.

Figure 3:
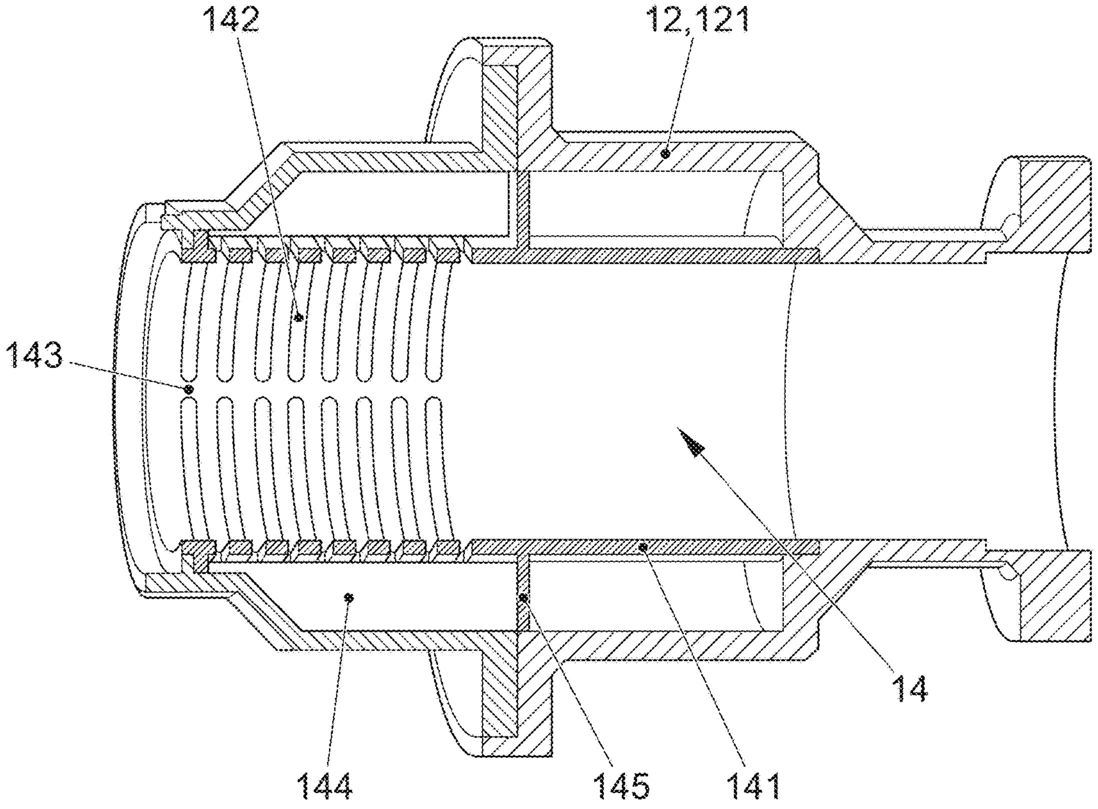
FIG. 3 is a cross-sectional view of the intake pipe of the turbocharger of FIG. 1 with resonator insert of FIG. 2.

The present invention is aimed at preventing annular flow in the resonator chamber 18. To this end, in the embodiment shown, two opposed lamellae 144 extend radially out from the tube section 141, as shown in FIG. 3, so that they abut the intake pipe 12 or outer pipe 121. The resonator chamber 18 is thus divided into two half-ring chambers, each of which acts as a Helmholtz resonator (with halved volume) in a known manner, but which no longer have any direct connection with each other, so that an annular flow circulating the tube section 141 is not possible.

In the embodiment shown, the tube section 141 is surrounded by an annular wall 145 that is perpendicular to the axial direction and has the same radial height as the lamellae 144. Thus, the annular wall 145 rests with its radially outer edge against the intake pipe 12 or outer pipe 121 and divides the annular chamber 18 into two axial sections separated from each other. In the embodiment shown, however, only the axial section on the left in FIGS. 2 and 3 is connected to the interior of the tube section 141 via acoustic slots 142 and is therefore effective as a Helmholtz resonator. The axial section on the right in FIGS. 2 and 3 is ineffective from an acoustic point of view. By a different choice of the axial position of the annular wall 145, modified acoustic properties can be obtained. It is also conceivable to provide both axial sections with acoustic slots 142 and to create two effective Helmholtz resonators whose annular chambers can also interact with each other if the annular wall 145 is radially lower or perforated. Of course, it is also possible to use multiple annular walls 145 or to dispense with the use of an annular wall 145 entirely. The skilled person will recognize that by all these measures the acoustic properties of the resulting resonator can be very finely tuned to the particular requirements of the individual case.

FIGS. 4 to 9 show alternate embodiments of the resonator insert according to the invention to the embodiment of FIG. 2, for which mutatis mutandis the same variation possibilities apply as described above in the context of the embodiment of FIG. 2. What the embodiments of FIGS. 4 to 9 have in common is that, in contrast to the embodiment of FIGS. 2 and 3, they do not effect a complete separation of the half-ring chambers created by the lamellae 144, so that all regions of the resonator chamber 18 are in direct air-exchanging communication with one another. From an acoustic point of view, this corresponds to an enlargement of the effective resonator chamber compared to the embodiment of FIGS. 2 and 3, which has a particularly positive effect on the attenuation of low sound frequencies. With regard to the suppression by the resonator chamber 18 of the annular flow recognized as harmful, they are admittedly less effective—in particular, only an obstruction and not a complete suppression of said annular flow takes place. However, this remaining obstruction is sufficient to achieve the desired effect of the broadening of the characteristic diagram to a sufficient extent.

Figure 4:
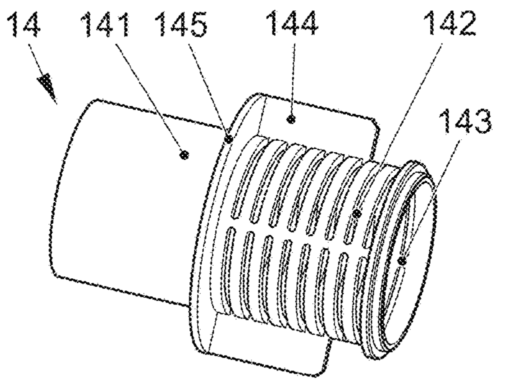
FIG. 4 is a perspective view of a resonator insert according to a second embodiment of the invention.

In the embodiment of FIG. 4, the lamellae 144 in the area close to the compressor wheel do not fit exactly against the obliquely tapering intake pipe 12 or the outer pipe 121. In this area, therefore, an annular connection remains between the partial chambers.

Figure 5:
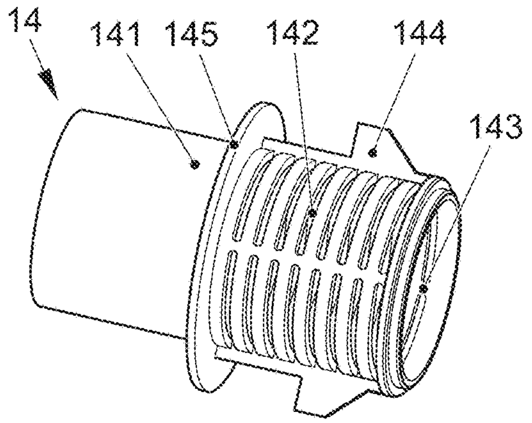
FIG. 5 is a perspective view of a resonator insert according to a third embodiment of the invention.

The situation is reversed in the embodiment shown in FIG. 5, where the lamellae 144 are in contact with the intake pipe 12 or the outer pipe 121 only in the area of their end close to the compressor wheel. Here, in particular near the annular wall, there is an annular connection between the partial chambers.

Figure 6:
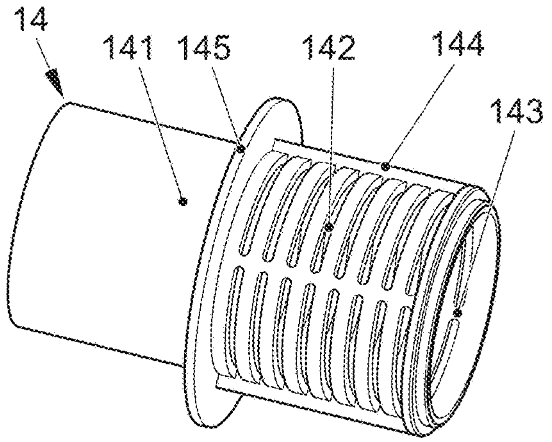
FIG. 6 is a perspective view of a resonator insert according to a fourth embodiment of the invention.
Figure 7:
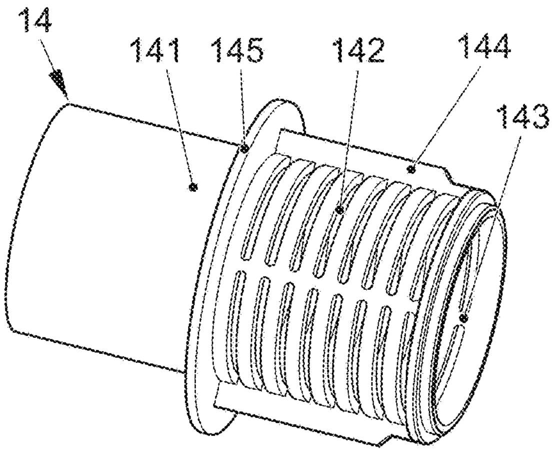
FIG. 7 is a perspective view of a resonator insert according to a fifth embodiment of the invention.

In the embodiments of FIGS. 6 and 7, the radial height of the lamellae 144—to varying degrees—is chosen to be lower over their entire axial length than would be required for a sealing division into two half chambers.

Figure 8:
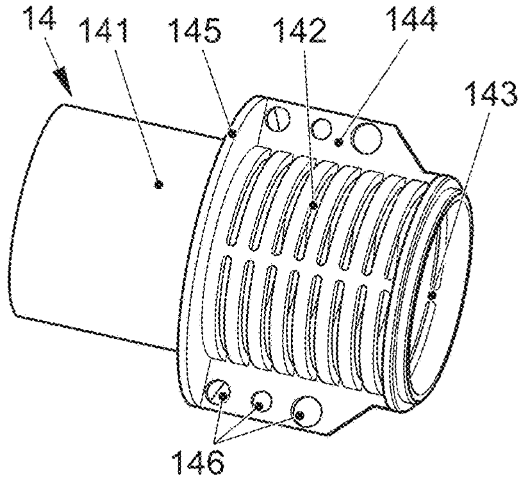
FIG. 8 is a perspective view of a resonator insert according to a sixth embodiment of the invention.
Figure 9:
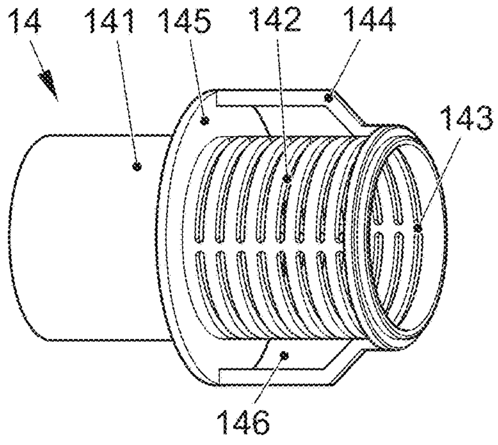
FIG. 9 is a perspective view of a resonator insert according to a seventh embodiment of the invention.

Finally, FIGS. 8 and 9 are characterized by through-holes 146 in the lamellae. In the embodiment of FIG. 8, several through-holes 146 are provided, and are designed as circular holes with different diameters. By selecting the number and diameter of these circular holes, the acoustic properties of the resulting resonator can be tuned finely. In the embodiment of FIG. 9, on the other hand, only one through hole 146 is provided and is adapted to the outer contour of the lamella to occupy the major part of the lamella surface. The lamella 144 is thus reduced to a bow that rests against the intake pipe 12 or outer pipe 121 and spans the passage opening 146 in an arc-like manner.

Of course, the embodiments discussed in the specific description and shown in the figures are only illustrative examples of embodiments of the present invention. The person skilled in the art is provided with a wide range of possible variations in light of the present disclosure. In particular, the specific dimensioning of the individual components of the resonator insert according to the invention must be adapted to the acoustic and characteristic field requirements of the individual case. With regard to the choice of materials used, in particular metal and/or plastic, the person skilled in the art will also know how to orient himself to the requirements of the individual case.

LIST OF REFERENCE SIGNS

10 Turbocharger
12 Intake pipe
121 Outer pipe
14 Resonator insert
141 Pipe section
142 Through-slot/Acoustic slot
143 Web
144 Lamella
145 Ring wall
146 Passage opening

The invention claimed is:

1. A resonator insert (14) for coaxial and sectionally radially spaced insertion into an intake pipe (12) of a turbocharger (10), the resonator insert (14) comprising: a tube section (141) having a wall with a plurality of through-slots (142) extending predominantly in a circumferential direction and axially adjacent to one another, the wall of the tube section (141) having at least one radially outwardly directed, axially extended lamella (144) crossing the through-slots (142), wherein the wall of the tube section (141) further carries a disc-shaped annular wall (145) arranged in an axially central region of the tube section (141) and extending radially outward, the disc-shaped annular wall (145) being aligned perpendicular to an axial direction so that, upon insertion of the resonator insert (14) into the intake pipe (12), a chamber (18) is defined between the resonator insert (14) and the intake pipe (12), and the disc-shaped annular wall (145) divides the chamber (18) into first and second axial chamber section sealed against each other, and with the through slots (142) being arranged only on an axial side of the annular wall aligned with the first axial chamber section so that the first axial chamber section defines a resonator chamber.

2. The resonator insert (14) of claim 1, wherein the at least one lamella (144) has a radially outer edge having a radial dimension that varies along an axial length of the at least one lamella (144).

3. The resonator insert (14) of claim 1, wherein the at least one lamella (144) has a radially outer edge having a radial dimension that remains constant along an axial length of the at least one lamella (144).

4. The resonator insert (14) of claim 1, wherein the at least one lamella (144) comprises one or more through openings (146).

5. The resonator insert (14) of claim 4, wherein the at least one lamella (14) has a plurality of through openings (146) configured as circular holes of different diameters.

6. The resonator insert (14) of claim 4, wherein the at least one lamella (14) has exactly one through opening (146) occupying a major part of an area of the respective lamella area, so that the lamella (144) is reduced to a bow arching over the through opening.

7. The resonator insert (14) of claim 1, wherein the at least one lamella (14) extends over an entire axial length of the tube section (141).

8. The resonator insert (14) of claim 1, wherein a radially outer edge of the lamella (14) is at the same radial height as a radially outer edge of the annular wall (145).

9. The resonator insert (14) of claim 1, wherein the radially outer edge of the lamella (14) is at a lower radial height than the radially outer edge of the annular wall (145).

10. The resonator insert (14) of claim 1, wherein the lamella (144) extends in the axial direction from a free end of the tube section to the annular wall (145).

11. The resonator insert (14) of claim 1, wherein the at least one lamella (144) comprises a plurality of lamellae (144) of the same shape distributed over a circumference of the tube section (141).

12. A turbocharger (10) for generating an air flow in a piping system, the turbocharger comprising:

a rotatable compressor wheel (16), an intake pipe (12) located directly upstream of the compressor wheel (16) in a direction of air flow, the intake pipe (12) having opposite ends with reduced pipe cross-sections, and a resonator insert (14) arranged coaxially in the intake pipe (12) and comprising a tube section (141) that terminates sealingly with the ends of the intake pipe (12) that have the reduced cross-section, the resonator insert (14) further having through-slots (142) extending predominantly in a circumferential direction and being axially adjacent to one another, the through slots (142) connecting an interior of the tube section (141) to a chamber (18) formed between a wall of the tube section (141) and a wall of the intake pipe (12), wherein, the wall of the tube section (141) carries at least one radially outwardly directed, axially extended lamella (144) crossing the through-slots (142), wherein the wall of the tube section (141) carries a disc-shaped annular wall (145) arranged in an axially central region of the tube section (141) and facing radially outwardly, the disc-shaped annular wall (145) being aligned perpendicular to an axial direction and resting against a wall of the intake pipe (12) so as to divide the chamber (18) into first and second axial chamber sections sealed against each other, and the through slots being arranged only on an axial side of the annular wall aligned with the first axial chamber section so that the first axial chamber section defines a resonator chamber.

13. The turbocharger (10) of claim 12, the at least one lamella (144) has a radially outer edge that rests against the wall of the intake pipe (12).

14. The turbocharger (10) of 12, wherein the at least one lamella (144) has a radially outer edge with at least a portion of the radially outer edge of the lamella (144) being at a distance from the wall of the intake pipe (12).

15. The turbocharger (10) of claim 12, wherein the lamella (144) extends over an entire axial length of the intake pipe (12) between the ends of the intake pipe (12) that are of reduced cross-section.

16. The turbocharger (10) of claim 12, wherein the through-slots (142) are arranged only on the compressor wheel side of the annular wall (145).

17. A resonator comprising: an outer pipe (121) with reduced pipe cross-sections at both ends, and a resonator insert (14) arranged coaxially in the outer pipe (121) and comprising a tube section (141) that terminates sealingly with the ends of the outer pipe (121) that have the reduced cross-section, the tube section (141) having a wall with axially adjacent through-slots (142) extending predominantly in a circumferential direction and via which an interior of the tube section (141) is connected to a chamber (18) formed between the tube section (141) and a wall of the outer pipe (121), and at least one axially extended lamella (14) crossing the through-slots (142), the at least one lamella (14) extending at least partly between the inner tube section (141) and the outer pipe (121) and connected to at least one of the inner tube section (141) or the outer pipe (121), wherein;

the wall of the tube section (141) further carries a disk-shaped annular wall (145) that is arranged in an axially central region of the tube section (141), the annular wall (145) faces radially outwardly, is aligned perpendicular to the axial direction and rest against the wall of the outer pipe (121), so that the annular wall (145) divided the resonator chamber into two axial annular chamber sections sealed against each other, and the through-slots (142) are arranged on only one axial side of the annular wall (145).

* * * * *